US010724607B2

(12) United States Patent
Saito et al.

(10) Patent No.: US 10,724,607 B2
(45) Date of Patent: Jul. 28, 2020

(54) SPEED REDUCTION OR SPEED INCREASING APPARATUS

(71) Applicant: THK CO., LTD., Tokyo (JP)

(72) Inventors: Hideo Saito, Tokyo (JP); Yuichi Mizutani, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/555,160

(22) PCT Filed: Mar. 2, 2016

(86) PCT No.: PCT/JP2016/056335
§ 371 (c)(1),
(2) Date: Sep. 1, 2017

(87) PCT Pub. No.: WO2016/140234
PCT Pub. Date: Sep. 9, 2016

(65) Prior Publication Data
US 2018/0045280 A1 Feb. 15, 2018

(30) Foreign Application Priority Data

Mar. 2, 2015 (JP) .................... 2015-039782
Mar. 2, 2015 (JP) .................... 2015-039783

(51) Int. Cl.
F16H 1/32 (2006.01)
F16H 55/08 (2006.01)
F16H 53/02 (2006.01)

(52) U.S. Cl.
CPC ............ F16H 1/321 (2013.01); F16H 53/02 (2013.01); F16H 55/08 (2013.01)

(58) Field of Classification Search
CPC .......... F16H 1/321; F16H 55/566; F16H 1/32; F16H 55/08; F16H 53/02; F16H 55/17
See application file for complete search history.

(56) References Cited

U.S. PATENT DOCUMENTS 3,385,135 A * 5/1968 Strandberg ............. F16H 1/321
464/145
3,895,540 A * 7/1975 Davidson ............... F16H 1/321
475/164

(Continued)

FOREIGN PATENT DOCUMENTS

CN 86203536 2/1987
JP 51-126467 11/1976

(Continued)

OTHER PUBLICATIONS

International Search Report, PCT/JP2016/056335, dated Mar. 29, 2016.

(Continued)

Primary Examiner — Jacob S. Scott
Assistant Examiner — James J Taylor, II
(74) Attorney, Agent, or Firm — Young & Thompson

(57) ABSTRACT

Provided is a speed reduction or speed increasing apparatus where the rotational stiffness can be increased, including a housing, a first crown gear, a support unit placed radially outward of the first crown gear to support the first crown gear to be capable of wave motion and incapable of rotation with respect to the housing, a second crown gear configured to be rotatable with respect to the housing, the second crown gear having a different number of teeth from the first crown gear, the second crown gear facing the first crown gear, and a cam unit configured to incline the first crown gear with respect to the second crown gear in such a manner that the first crown gear engages with the second crown gear, and to cause the first crown gear to undergo wave motion in such a manner that the location of contact moves.

3 Claims, 23 Drawing Sheets

(56) References Cited

U.S. PATENT DOCUMENTS

| | | | | |
|---|---|---|---|---|
| 4,041,808 | A | * | 8/1977 | Fickelscher ............ F16H 1/321 475/163 |
| 4,281,566 | A | * | 8/1981 | Brusasco ................ F16H 1/321 464/39 |
| 4,946,428 | A | * | 8/1990 | Barozzi ................... F16H 1/321 475/164 |
| 5,383,821 | A | | 1/1995 | Murakami et al. |
| 5,850,765 | A | * | 12/1998 | Shirasawa ............ F16H 49/001 74/640 |
| 5,954,610 | A | * | 9/1999 | Kamimura ................ B23F 5/02 409/51 |
| 5,967,883 | A | * | 10/1999 | Kamimura ................ B23F 5/02 451/129 |
| 8,216,104 | B2 | * | 7/2012 | Kuroumaru ............ B62D 5/008 475/164 |
| 8,777,696 | B2 | * | 7/2014 | Ando ..................... B23F 15/00 409/1 |
| 9,316,289 | B2 | * | 4/2016 | Takahashi ................ F16H 1/32 |
| 9,427,866 | B2 | * | 8/2016 | Hasegawa ............... B25J 9/104 |
| 2005/0221937 | A1 | * | 10/2005 | Vladimirovich ........ F16H 1/321 474/163 |
| 2011/0237381 | A1 | * | 9/2011 | Puchhammer .......... F16H 1/321 475/163 |
| 2015/0224642 | A1 | * | 8/2015 | Hasegawa ............... B25J 9/104 74/416 |

FOREIGN PATENT DOCUMENTS

| | | |
|---|---|---|
| JP | S52-74765 A | 6/1977 |
| JP | S53-118948 U | 9/1978 |
| JP | S57-15140 A | 1/1982 |
| JP | H01-247847 A | 10/1989 |
| JP | 6-235445 | 8/1994 |
| JP | 2003-042240 | 2/2003 |
| JP | 2003-130148 | 5/2003 |
| WO | 2014/076772 A1 | 5/2014 |

OTHER PUBLICATIONS

Chinese Office Action for Application No. 201680011974.7, dated Dec. 29, 2018, with English translation provided.

Japanese Office Action for Application No. 2016-039523, dated Dec. 3, 2019, with English translation provided.

Japanese Office Action for Application No. 2016-039523, dated Mar. 3, 2020, with English translation provided.

Japanese Office Action for Application No. 2016-039522, dated Mar. 3, 2020, with English translation provided.

* cited by examiner

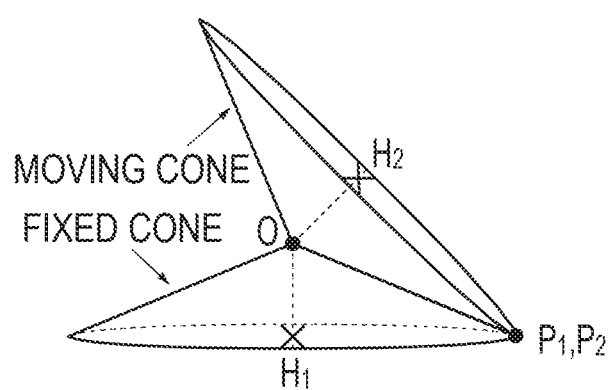 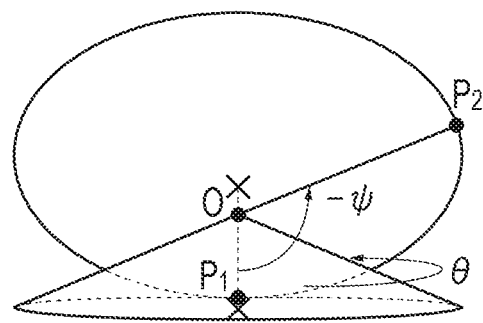
*FIG. 10A*     *FIG. 10B*

SPEED REDUCTION OR SPEED INCREASING APPARATUS

TECHNICAL FIELD

The present invention relates to a speed reduction or speed increasing apparatus in which a first crown gear and a second crown gear having different numbers of teeth from each other are caused to face each other, the first crown gear is inclined with respect to the second crown gear in such a manner that the first crown gear engages with the second crown gear, and the first crown gear is caused to undergo wave motion in such a manner that the location of contact moves.

BACKGROUND ART

As a known speed reduction or speed increasing apparatus, one in which two spur gears having an involute tooth profile is known. The spur gear having the involute tooth profile is heavily used in the speed reduction or speed increasing apparatus since its manufacture is easy and it is efficient. However, there is a limit to the difference in the number of teeth between two spur gears. Hence, there is a problem that the speed reduction ratio or speed increasing ratio cannot be increased.

In order to increase the speed reduction ratio or speed increasing ratio, a speed reduction or speed increasing apparatus has been developed in which a first crown gear and a second crown gear having different numbers of teeth from each other are caused to face each other, the first crown gear is inclined with respect to the second crown gear in such a manner that the first crown gear engages with the second crown gear, and the first crown gear is caused to undergo wave motion in such a manner that the location of contact moves. When the first crown gear is caused to undergo wave motion, the second crown gear makes rotations equal to a difference in the number of teeth relatively to the first crown gear whenever the location of contact makes one rotation. A large speed reduction ratio can be obtained by outputting rotations equal to the difference in the number of teeth between the gears. Conversely, a large speed increasing ratio can be obtained by rotating the second crown gear.

For example, Patent Literature 1 discloses a speed reduction apparatus including a first crown gear, a second crown gear, and an inclined cam, as this kind of speed reduction apparatus. The first crown gear and the second crown gear have different numbers of teeth, and face each other. The first crown gear is inclined by the inclined cam integral with an input shaft. When the first crown gear is inclined, the first crown gear and the second crown gear engage with each other at one point. The second crown gear is fixed to a housing. The first crown gear is supported by a spherical spline joint placed radially inward of the first crown gear in such a manner as to be capable of wave motion.

When the input shaft is rotated, the inclined cam integral with the input shaft causes the first crown gear to undergo wave motion while moving the location of contact with the second crown gear. The wave motion of the first crown gear causes the first crown gear to make rotations equal to the difference in the number of teeth with respect to the second crown gear. The rotation of the first crown gear is transmitted to an output shaft via the spherical spline joint.

CITATION LIST

Patent Literature

Patent Literature 1: JP 51-126467 A

SUMMARY OF INVENTION

Technical Problem

In the known speed reduction apparatus, the spherical spline joint that supports the first crown gear in such a manner as to be capable of wave motion is placed radially inward of the first crown gear. The rotational motion of the first crown gear is transmitted to the output shaft via the spline joint. However, the diameter of the spline joint largely affects the rotational stiffness of the spline joint, and by extension the rotational stiffness of the speed reduction apparatus. In the known speed reduction apparatus, the diameter of the spline joint is small. Accordingly, there is a problem that the rotational stiffness of the spline joint, and by extension the rotational stiffness of the speed reduction apparatus, cannot be increased.

Hence, a first object of the present invention is to provide a speed reduction or speed increasing apparatus that can increase rotational stiffness.

Moreover, in the known speed reduction apparatus, the teeth of the first and second crown gears are formed into a triangular or trapezoidal shape. At the location of contact between the first and second crown gears, a tooth of the first crown gear is tightly fitted to a tooth space of the second crown gear. Hence, if there is a pitch deviation and/or a profile deviation in the teeth of the first and second crown gears, it becomes impossible to smoothly fit a tooth of the first crown gear to the tooth space of the second crown gear. In addition, the engaging first and second crown gears mostly do not roll but slip. Accordingly, there is a problem of poor gear efficiency.

Hence, a second object of the present invention is to provide a highly efficient speed reduction or speed increasing apparatus that can smoothly fit a tooth of the first crown gear to a tooth space of the second crown gear.

Solution to Problem

In order to solve the above problems, a first mode of the present invention is a speed reduction or speed increasing apparatus including: a housing; a first crown gear; a support unit, placed radially outward of the first crown gear, to support the first crown gear in such a manner as to be capable of wave motion and incapable of rotation with respect to the housing; a second crown gear configured to be rotatable with respect to the housing, the second crown gear having a different number of teeth from the first crown gear, the second crown gear facing the first crown gear; and a cam unit configured to incline the first crown gear with respect to the second crown gear in such a manner that the first crown gear engages with the second crown gear, and to cause the first crown gear to undergo wave motion in such a manner that a location of contact moves.

A second mode of the present invention is a speed reduction or speed increasing apparatus including: a first crown gear; a second crown gear having a different number of teeth from the first crown gear, the second crown gear facing the first crown gear; and a cam unit configured to incline the first crown gear with respect to the second crown gear in such a manner that the first crown gear engages with the second crown gear, and causes the first crown gear to undergo wave motion in such a manner that a location of contact moves, wherein the first crown gear and the second crown gear alternately include a top portion and a bottom portion in a circumferential direction, the top portion is of a convex shape based on a side surface of a cone, and the bottom portion is of a concave shape based on a side surface of a cone.

In the second mode of the present invention, the convex and concave shapes based on a side surface of a cone include a convex and a concave shape formed by a side surface of a cone, and a convex and a concave shape generated using a trochoid curve described when a conical body of the first crown gear is rolled along a conical body of the second crown gear. Moreover, a case is also included in which tooth traces of the top portion and the bottom portion having such convex and concave shapes are helical.

Advantageous Effects of Invention

According to the first mode of the present invention, the support unit that makes the first crown gear capable of wave motion and incapable of rotation is placed radially outward of the first crown gear; accordingly, the diameter of the support unit can be increased. The rotational stiffness of the support unit, and by extension the rotational stiffness of the speed reduction or speed increasing apparatus, can be increased.

According to the second mode of the present invention, the top portions of the first crown gear and the second crown gear are of the convex shape based on aside surface of a cone, and the bottom portions of the first crown gear and the second crown gear are of the concave shape based on a side surface of a cone. Accordingly, the top portions of one of the first crown gear and the second crown gear can be smoothly fitted to the bottom portions of the other. Moreover, the top portions of one of them and the bottom portions of the other engage with each other, mostly rolling. Accordingly, the gear efficiency can be improved.

BRIEF DESCRIPTION OF DRAWINGS

FIG. 10A is a perspective view illustrating a state where apices and generatrices of a moving cone (a body of the first crown gear) and a fixed cone (a body of the second crown gear) are in contact, and FIG. 10B is a perspective view illustrating the precession of the moving cone.

DESCRIPTION OF EMBODIMENTS

A speed reduction apparatus of one embodiment of the present invention is described in detail hereinafter with reference to the accompanying drawings. However, the speed reduction apparatus of the present invention can be embodied in various modes, and is not limited to embodiments described in the description. The embodiments are provided with the intention of enabling those skilled in the art to fully understand the scope of the invention by sufficiently disclosing the description.

<The Entire Configuration of a Speed Reduction Apparatus of a First Embodiment>

Figure 1:
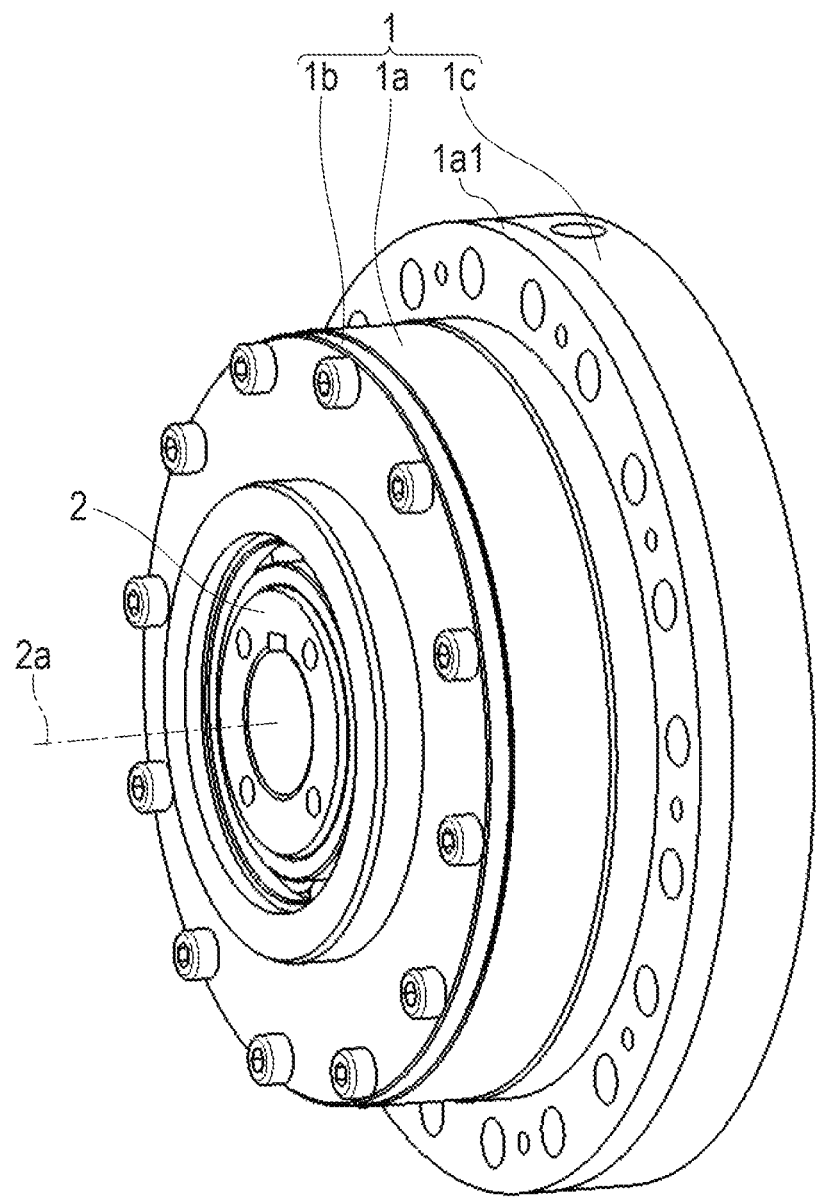
FIG. 1 is an external perspective view of an input shaft side of a speed reduction apparatus of the embodiment.
Figure 2:
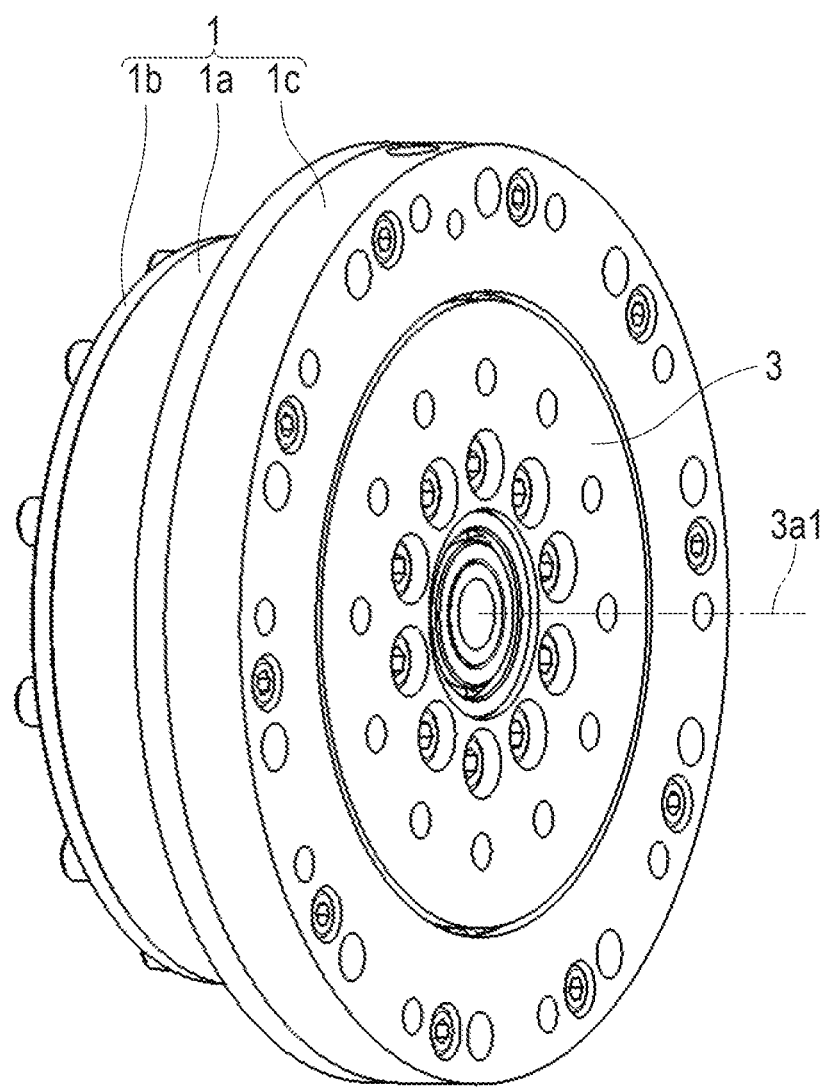
FIG. 2 is an external perspective view of an output unit side of the speed reduction apparatus of the embodiment.

FIG. 1 illustrates an external perspective view of an input shaft side of a speed reduction apparatus of a first embodiment of the present invention. FIG. 2 illustrates an external perspective view of an output unit side of the speed reduction apparatus. The same reference signs are assigned to the same configurations throughout the accompanying drawings and the following description.

An input shaft 2 and an output unit 3 are rotatably housed in a housing 1. An axis 2a of the input shaft 2 agrees with an axis 3a1 of the output unit 3. When the input shaft 2 is rotated about the axis 2a, the speed of the output unit 3 is reduced to rotate the output unit 3 about the axis 3a1. The speed reduction ratio of the output unit 3 with respect to the input shaft 2 is determined by the numbers of teeth of a first crown gear 11 and a second crown gear 12 (refer to FIG. 3) that are housed in the housing 1.

The housing 1 includes a cylindrical housing body 1a having a flange 1a1, and disc-shaped lid members 1b and 1c that are attached to both of axial ends of the housing body 1a. A through-hole for attachment to a counter part is opened in the flange 1a1 of the housing body 1a. The lid members 1b and 1c are fixed by a fastening member such as a bolt to the housing body 1a.

Figure 3:
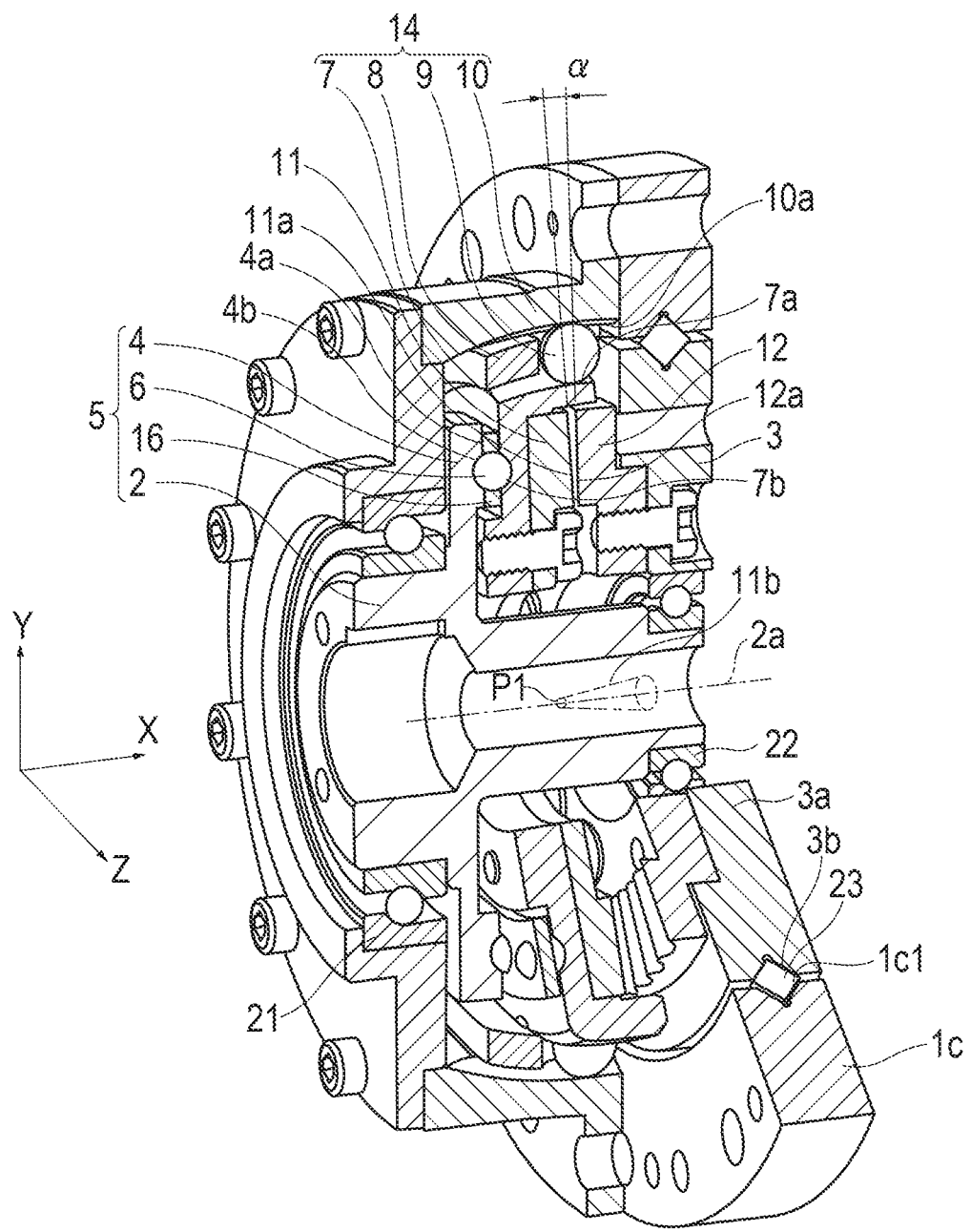
FIG. 3 is a cross-sectional perspective view of the speed reduction apparatus of the embodiment.
Figure 4:
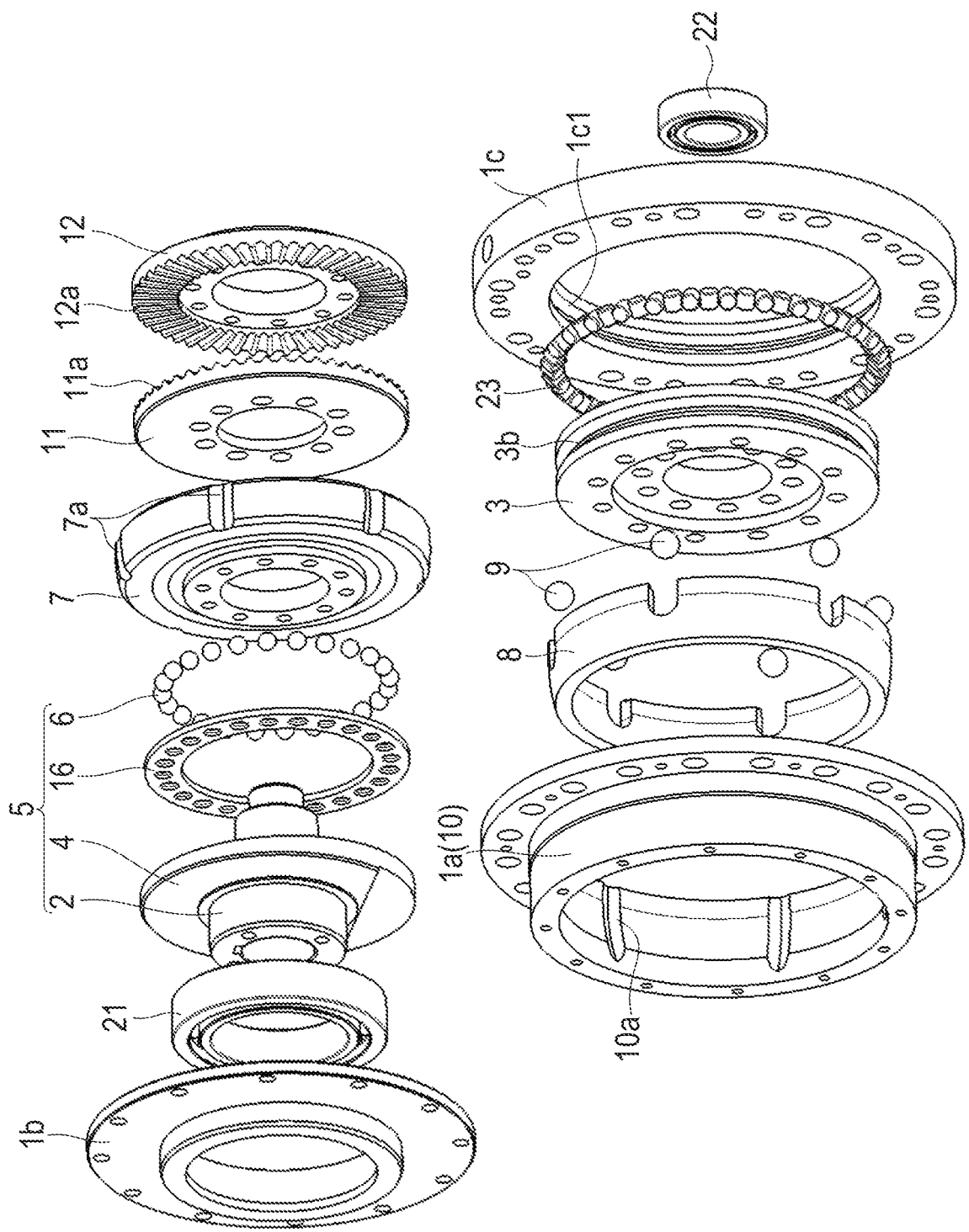
FIG. 4 is an exploded perspective view of the speed reduction apparatus of the embodiment.

FIG. 3 illustrates a cross-sectional perspective view of the speed reduction apparatus of the embodiment. FIG. 4 illustrates an exploded perspective view of the speed reduction apparatus of the embodiment. As illustrated in FIG. 3, the speed reduction apparatus includes the housing 1, a cam unit 5 having an inclined cam 4 integral with the input shaft 2, the first crown gear 11, a support unit (spherical spline) 14 that supports the first crown gear 11 in such a manner as to be capable of wave motion and incapable of rotation, the second crown gear 12, and the output unit 3 that is coupled to the second crown gear 12. For convenience of description, the configuration of the speed reduction apparatus is described below, using directions when the axis 2a of the input shaft 2 and the output unit 3 is placed in an X direction, that is, X, Y, and Z directions illustrated in FIG. 3.

As illustrated in FIG. 4, the first crown gear 11 and the second crown gear 12 are disc-shaped. A plurality of teeth is radially formed on an opposing surface 11a of the first crown gear 11 and an opposing surface 12a of the second crown gear 12. The numbers of teeth of the first crown gear 11 and the second crown gear 12 are not particularly limited. For example, the number of teeth of the first crown gear 11 is 49, and the number of teeth of the second crown gear 12 is 50. The number of teeth of the first crown gear 11 is different from that of the second crown gear 12. Since the numbers of teeth are different, they cannot engage each other in a state where the axes of the first crown gear 11 and the second crown gear 12 are in agreement. Hence, the first crown gear 11 is inclined with respect to the second crown gear 12 to engage a part of the first crown gear 11 with a part of the second crown gear 12. The opposing surface 12a of the second crown gear 12 is placed in a Y-Z plane of FIG. 3. The opposing surface 11a of the first crown gear 11 is inclined about the Z-axis by an angle α with respect to the Y-Z plane of FIG. 3.

As illustrated in FIG. 3, the cam unit 5 includes the input shaft 2 that is supported by the housing 1 in such a manner as to be rotatable about the axis, the disc-shaped inclined cam 4 provided integrally with the input shaft 2, and a ball 6 as a rolling element that is disposed between the inclined cam 4 and the first crown gear 11 (specifically, an inner ring portion integrally fixed to the first crown gear 11) in such a manner as to be capable of rolling motion (refer also to FIG. 4). The inclined cam 4 is provided to incline the first crown gear 11. A cam surface 4a of the inclined cam 4 is inclined about the Z-axis by the angle α with respect to the Y-Z plane as in the first crown gear 11, and faces the first crown gear 11. A circular ball rolling groove 4b is formed in the cam surface 4a of the inclined cam 4. A circular ball rolling groove 7b facing the ball rolling groove 4b of the inclined cam 4 is also formed in the inner ring portion 7 of the support unit 14. A plurality of the balls 6 is arranged between the ball rolling grooves 4b and 7b in such a manner as to be capable of rolling motion in a circumferential direction. The first crown gear 11 is pressed against the second crown gear 12, and preloads the balls 6 to eliminate backlash between the first crown gear 11 and the second crown gear 12. A gap between the ball rolling grooves 4b and 7b is smaller than the diameter of the ball 6. The balls 6 are compressed between the ball rolling grooves 4b and 7b. The balls 6 are held in a ring-shaped cage 16.

The input shaft 2 penetrates the first crown gear 11 and the second crown gear 12. The input shaft 2 is hollow. Both of the axial ends of the input shaft 2 are rotatably supported by bearings 21 and 22. The bearings 21 and 22 are placed axially outward of the first crown gear 11 and the second crown gear 12.

As illustrated in FIG. 3, the support unit 14 is placed radially outward of the first crown gear 11. The support unit 14 supports the first crown gear 11 in such a manner as to be capable of wave motion with respect to the housing 1 (in other words, rotatably in such a manner that an axis 11b of the first crown gear 11 describes the locus of a cone with a point P1 as the apex as illustrated in FIG. 3) and be incapable of rotation about the axis. The wave motion of the first crown gear 11 is also called precession.

As illustrated in FIG. 3, the support unit 14 includes an outer ring portion 10 having an outer ring spline groove 10a (refer to FIG. 4) in its spherical inner peripheral surface, the inner ring portion 7 placed inside the outer ring portion 10, the inner ring portion 7 having, in its spherical outer peripheral surface, an inner ring spline groove 7a (refer to FIG. 4) facing the outer ring spline groove 10a, and a ball 9 as a rolling element that is disposed between the outer ring spline groove 10a and the inner ring spline groove 7a in such a manner as to be capable of rolling motion along the locus of an arc in the axial direction. The outer ring portion 10 is integral with the housing 1. The inner ring portion 7 is fixed by a fastening member such as a bolt to the first crown gear 11. The ball 9 is held by a cage 8. The support unit 14 makes the first crown gear 11 swingable about the Z-axis and the Y-axis with the point P1 on the axis 2a as the center. The rotational motion of the first crown gear 11 about the axis 2a is restricted by the spline mechanism of the support unit 14. The ball rolling groove 7b of the cam unit 5 is formed in the inner ring portion 7 to make the wave motion of the first crown gear 11 whose rotation is restricted smooth.

An inner ring 3a of the output unit 3 is fixed by a fastening member such as a bolt to the second crown gear 12. The output unit 3 is rotatably supported by a cross roller 23 to the housing 1. The cross roller 23 is a roller line where the axes of rollers adjacent in the circumferential direction are orthogonal when viewed from the circumferential direction (refer to FIG. 4). The second crown gear 12 is rotatably supported to the housing 1 via the output unit 3. A circular raceway 1c1 is formed in an inner peripheral surface of the lid member 1c of the housing 1. A circular raceway 3b facing the raceway 1c1 is formed in an outer peripheral surface of the inner ring 3a of the output unit 3. The cross roller 23 is placed as a rolling element between the raceways 1c1 and 3b. A moment produced by a reaction at the location of contact between the first crown gear 11 and the second crown gear 12 acts on the output unit 3. The use of the cross roller 23 can improve the moment stiffness of the output unit 3. The bearing 22 that rotatably supports one end of the input shaft 2 is placed between the output unit 3 and the input shaft 2.

When an unillustrated drive source such as a motor is used to rotate the cam unit 5 about the axis, the inclined cam 4 of the cam unit 5 causes the first crown gear 11 to undergo wave motion while moving the location of contact with the second crown gear 12. The second crown gear 12 makes rotations equal to the difference in the number of teeth relatively to the first crown gear 11 with the wave motion of the first crown gear 11. In the embodiment, for example, the number of teeth of the first crown gear 11 is 49, and the number of teeth of the second crown gear 12 is 50. The rotation of the first crown gear 11 with respect to the housing 1 is restricted by the support unit 14, and the rotation of the output unit 3 with respect to the housing 1 is permitted. Hence, the output unit 3 is reduced in speed by one tooth, and is rotated to obtain a speed reduction ratio of 1/50. The numbers of teeth of the first crown gear 11 and the second crown gear 12 are not limited.

<The Form of Teeth of the First and Second Crown Gears (an Example where the Top Portion and the Bottom Portion are Formed by a Side Surface of a Cone)>

Figure 5A:
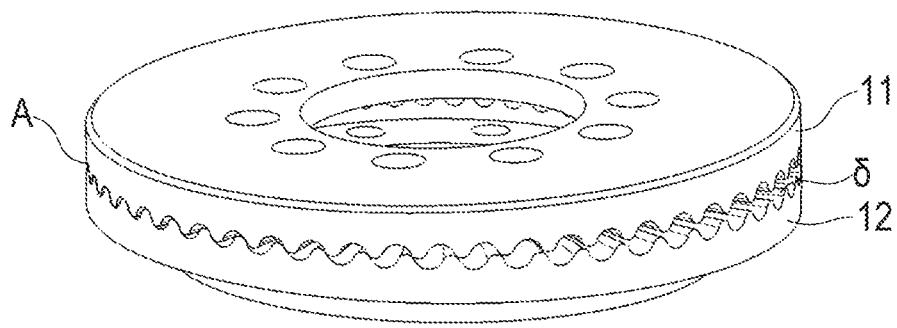
FIGS. 5A to 5C are perspective views illustrating a first and a second crown gear (FIG. 5A illustrates the second crown gear, and the first crown gear engaging with the second crown gear with an inclination, FIG. 5B illustrates the second crown gear, and FIG. 5C illustrates the first crown gear).

The form of teeth of the first crown gear 11 and the second crown gear 12 is as follows: FIG. 5A illustrates the second crown gear 12 and the first crown gear 11 engaging with the second crown gear 12 with an inclination. As illustrated in FIG. 5A, the first crown gear 11 and the second crown gear 12 engage at one point (a position A at the left end of FIG. 5A. However, the cam unit 5 preloads the first crown gear 11. Accordingly, a touch area of the first crown gear 11 and the second crown gear 12 stretches over a plurality of teeth in the circumferential direction with the location of contact as the center. The first crown gear 11 is inclined; accordingly, a gap δ between the first crown gear 11 and the second crown gear 12 is gradually increased toward the right in FIG. 5A.

As illustrated in FIG. 5A, the diameter of the first crown gear 11 is equal to that of the second crown gear 12. The number of teeth of the first crown gear 11 is different from that of the second crown gear 12; accordingly, the tooth pitch of the first crown gear 11 is different from that of the first crown gear 11.

Figure 5B:
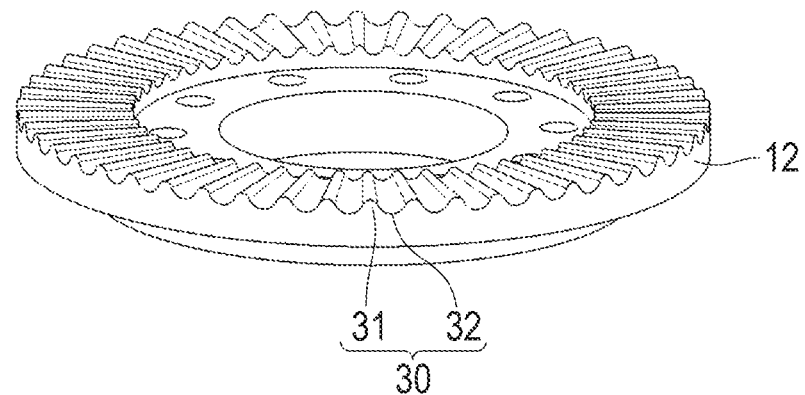

FIG. 5B illustrates the second crown gear 12. The second crown gear 12 is bevel gear-shaped and has a conical body. Wave-shaped teeth 30 are continuously formed in the circumferential direction on a surface of the second crown gear 12. The second crown gear 12 alternately includes, in the circumferential direction, a plurality of top portions 31 that are placed radially, and a plurality of bottom portions 32 that are placed radially. The top portion 31 of the second crown gear 12 is of a convex shape formed by a side surface of a cone. The bottom portion 32 of the second crown gear 12 is of a concave shape formed by a side surface of a cone.

Figure 5C:
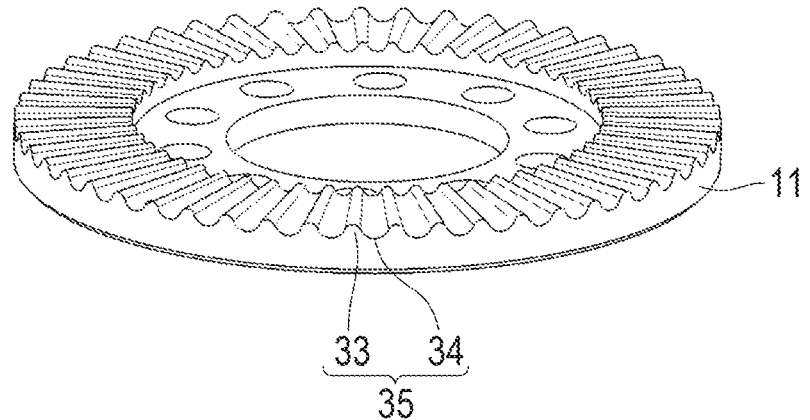

FIG. 5C illustrates the first crown gear 11. The first crown gear 11 is also bevel gear-shaped and has a conical body. Wave-shaped teeth 35 are also continuously formed in the circumferential direction on a surface of the first crown gear 11. The first crown gear 11 also alternately includes, in the circumferential direction, a plurality of top portions 33 that are placed radially, and a plurality of bottom portions 34 that are placed radially. The top portion 33 of the first crown gear 11 is of a convex shape formed by a side surface of a cone. The bottom portion 34 of the first crown gear 11 is of a concave shape formed by a side surface of a cone.

Figure 6:
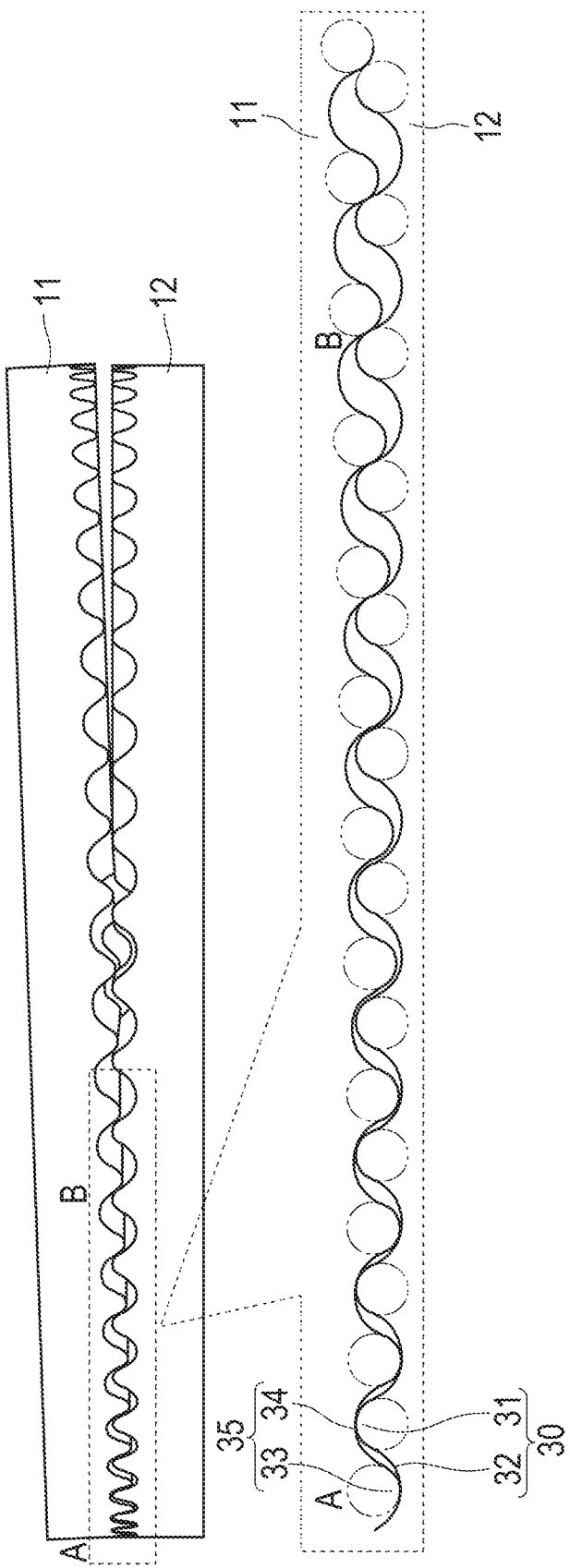
FIG. 6 is a developed view of the teeth of the first and second crown gears.

As illustrated in a developed view of FIG. 6, the radius of the bottom portion 32 of the second crown gear 12 is larger than that of the top portion 33 of the first crown gear 11. The top portion 33 of the first crown gear 11 is fitted to the bottom portion 32 of the second crown gear 12. The tip of the top portion 33 of the first crown gear 11 and the bottom portion 32 of the second crown gear 12 touch each other at the contact position A. The radius of the bottom portion 34 of the first crown gear 11 is larger than that of the top portion 31 of the second crown gear 12. The top portion 31 of the second crown gear 12 is fitted to the bottom portion 34 of the first crown gear 11. The contact position A moves with the wave motion of the first crown gear 11, and the tip of the top portion 31 of the second crown gear 12 and the bottom portion 34 of the first crown gear 11 touch each other.

Figure 7A:
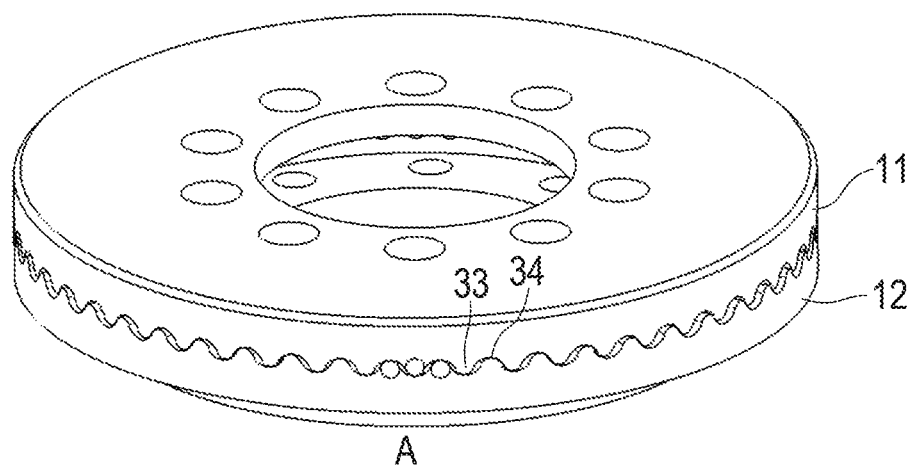
FIGS. 7A and 7B are perspective views illustrating schematic views of the teeth of the first and second crown gears (FIG. 7A illustrates the first and second crown gears, and FIG. 7B illustrates the second crown gear).
Figure 7B:
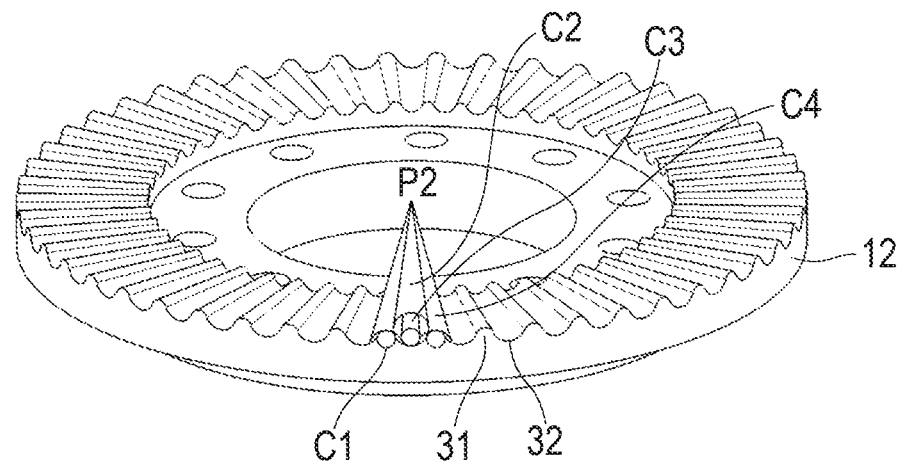

FIGS. 7A and 7B illustrate perspective views where cones are added to the teeth of the second crown gear 12 and the first crown gear 11. In order to facilitate the understanding of the tooth form, the cones are added here. As illustrated in FIG. 7B, the top portion 31 of the second crown gear 12 is formed into a taper whose width is reduced toward the center. Specifically, the top portion 31 of the second crown gear 12 is formed by a part of a side surface of a cone C1. The bottom portion 32 of the second crown gear 12 is also formed into a taper whose width is reduced toward the center. Specifically, the bottom portion 32 of the second crown gear 12 is formed by a part of a side surface of a cone C2. On the same circumference, the radius of the cone C2 of the bottom portion 32 is larger than that of the cone C1 of the top portion 31. The apices of the cones C1 of the plurality of the top portions 31 intersect at an engagement center P2. Apices of the cones C2 of the plurality of the bottom portions 32 also intersect at the engagement center P2. As illustrated in FIG. 3, the engagement center P2 is located on the axis 2a of the input shaft 2, and agrees with the center P1 of the wave motion of the first crown gear 11. Consequently, the first crown gear 11 and the second crown gear 12 can come into line contact with each other.

As illustrated in FIG. 7A, the top portion 33 of the first crown gear 11 is formed by a part of a side surface of a cone C3 whose width is reduced toward the center. The bottom portion 34 of the first crown gear 11 is formed by a part of a side surface of a cone C4 whose width is reduced toward the center. The radius of the cone C4 of the bottom portion 34 is larger than that of the cone C3 of the top portion 33. In order to make the tooth pitch of the first crown gear 11 different from the tooth pitch of the second crown gear 12, the radius of the cone C3 of the top portion 33 of the first crown gear 11 is equal to that of the cone C1 of the top portion 31 of the second crown gear 12, and the radius of the cone C4 of the bottom portion 34 of the first crown gear 11 is smaller than that of the cone C2 of the bottom portion 32 of the second crown gear 12. The apices of the cones C3 of the plurality of the top portions 33 of the first crown gear 11 agree with the engagement center P2 of the second crown gear 12. Apices of the cones C4 of the plurality of the bottom portions 34 of the first crown gear 11 agree with the engagement center P2 of the second crown gear 12.

As illustrated in the developed view of FIG. 6, the top portion 33 of the first crown gear 11 is formed in an arc shape, and the bottom portion 34 is also formed in an arc shape. The top portion 31 of the second crown gear 12 is formed in an arc shape, and the bottom portion 32 is also formed in an arc shape. Strictly speaking, the development of the teeth 30 and 35 of the conical first crown gear 11 and second crown gear 12 describes an eclipse, but can be regarded as an arc. As described above, the radius of the arc of the top portion 33 of the first crown gear 11 is equal to that of the arc of the top portion 31 of the second crown gear 12. In order to make the pitch of the teeth 35 of the first crown gear 11 different from that of the teeth 30 of the second crown gear 12, the radius of the bottom portion 34 of the first crown gear 11 is smaller than that of the bottom portion 32 of the second crown gear 12.

In a state where the first crown gear 11 is not preloaded, the top portion 33 of the first crown gear 11 and the second crown gear 12 touch each other only at one point A. If the first crown gear 11 is preloaded, a plurality of the teeth 35 of the first crown gear 11 and a plurality of the teeth 30 of the second crown gear 12 touch each other. When the first crown gear 11 is caused to undergo wave motion, the contact position A moves in the circumferential direction of the first crown gear 11 and the second crown gear 12, and then the second crown gear 12 makes rotations equal to the difference in the number of teeth relatively to the first crown gear 11.
<Another Example of the Form of Teeth of the First and Second Crown Gears (an Example where the Top Portion is Formed by a Side Surface of a Cone and the Bottom Portion is Generated Using a Trochoid Curve)>

Figure 8:
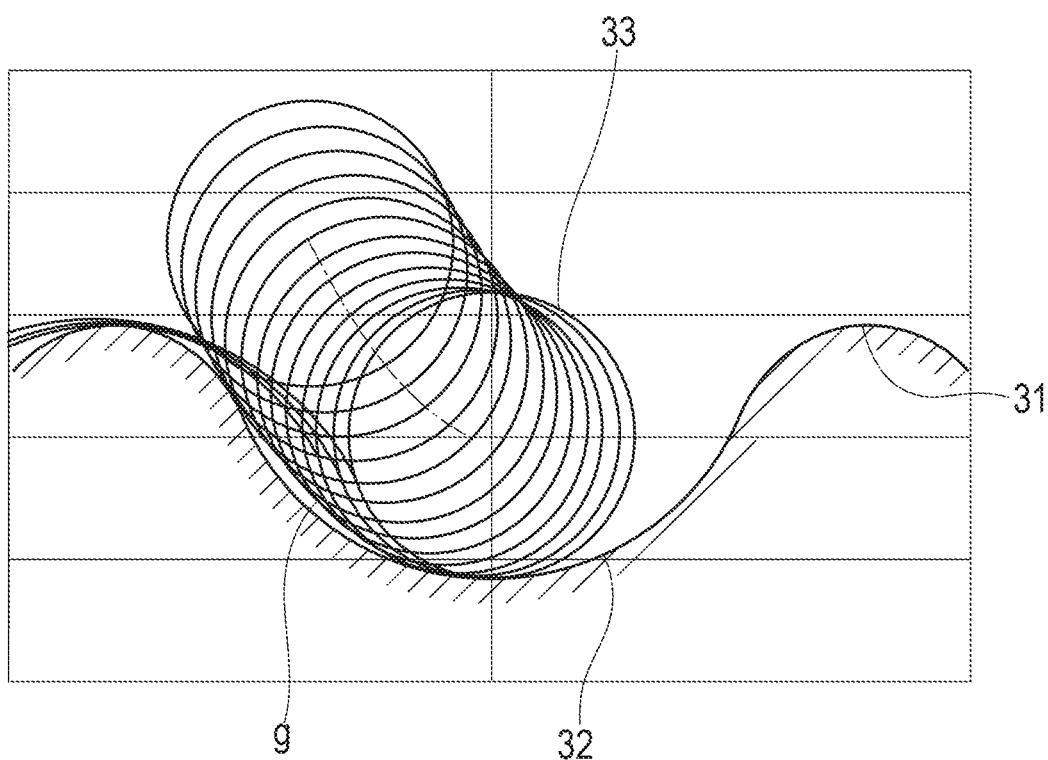
FIG. 8 is a developed view of the teeth of the first and second crown gears.

When the top portions 33 and 31 and the bottom portions 34 and 32 of the first crown gear 11 and the second crown gear 12 are of a shape formed by a side surface of a cone, it is easy to manufacture the first crown gear 11 and the second crown gear 12. However, when the locus of the top portion 33 (illustrated in a circle) of the first crown gear 11 is described as illustrated in a developed view of the teeth of the first crown gear 11 and the second crown gear 12 of FIG. 8, a slight gap g is created between the first crown gear 11 and the second crown gear 12. The gap g may invite an angular transmission error and an increase in drive sound. This example illustrates that the gap g is eliminated to cause the top portion 33 and the bottom portion 32 to roll completely, and improve the angular transmission accuracy and the noise reduction performance. However, the gap g is very small. Even if the gap g is not eliminated, the angular transmission accuracy equal to an involute tooth profile is obtained.

(An Overview of Design)

Figure 9:
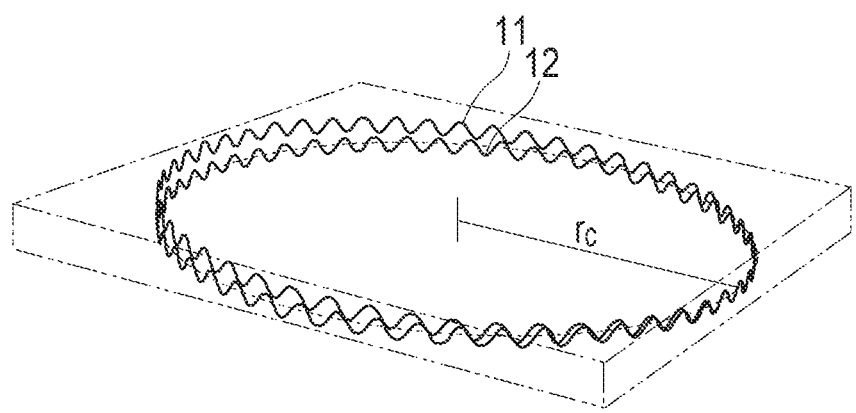
FIG. 9 is a perspective view illustrating tooth profile curves of the first and second crown gears on a reference circle $r_c$.

Firstly, the design of tooth profile curved surfaces of the first crown gear 11 and the second crown gear 12 starts with creating tooth profile curves of the first crown gear 11 and the second crown gear 12 on a reference circle $r_c$ as illustrated in FIG. 9. The created tooth profile curve is one curve, and is not a surface. In order to obtain tooth profile curved surfaces of the first crown gear 11 and the second crown gear 12, the tooth profile curves obtained by changing the radius $r_c$ of the reference circle are placed along the conical bodies of the first crown gear 11 and the second crown gear 12. Consequently, the tooth profile curved surfaces of the first crown gear 11 and the second crown gear 12 are obtained.

(A Design Guideline of Tooth Profile Curves)

It is assumed that the top portions 33 and 31 of the first crown gear 11 and the second crown gear 12 are formed by a side surface of a cone, and that the curves of the top portions 33 and 31 of the first crown gear 11 and the second crown gear 12 on the reference circle $r_c$ are arcs with a single R. At this point in time, the root curves of the bottom portions 34 and 32 are paths followed by the top portions 33 and 31 to cause both of the top portions 33 and 31 and the bottom portions 34 and 32 to undergo rolling motion. The arcs with the single R of the top portions 33 and 31 are smoothly connected to the root curves of the bottom portions 34 and 32 to obtain the tooth profile curves of the first crown gear 11 and the second crown gear 12 on the reference circle $r_c$ as illustrated in FIG. 9. The tooth profile curves are created in the following sequence.

(i) The curves (trochoid curves) along which the top portions 33 and 31 need to pass in wave motion (hereinafter referred to as precession) are obtained.

(ii) The radii of the top portions 33 and 31 are assumed to obtain curves described when the top portions 33 and 31 pass along the trochoid curves obtained in (i). The curves are defined as the root curves of the bottom portions 34 and 32.

(iii) The radii of the top portions 33 and 31 are determined in such a manner as to smoothly connect the addendum curves (arcs) of the top portions 33 and 31 to the root curves of the bottom portions 34 and 32.

(The Calculation of a Trochoid Curve where the Top Portion Needs to Pass)

The first crown gear 11 engages with the second crown gear 12 while undergoing precession. The first crown gear 11 and the second crown gear 12 have a conical body. Their tooth flanks are on the conical bodies. Therefore, the congruent tooth profile curves lie in the circumferential direction. However, the tooth profile curves are similar but not congruent in the radial direction. Hence, a certain reference circle $r_c$ is determined to obtain tooth profile curves on the reference circle $r_c$.

Figure 11:
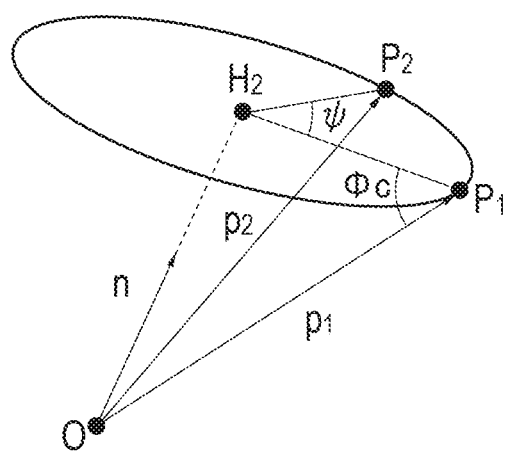
FIG. 11 is a diagram illustrating the relationships between points on the moving cone and vectors.

Firstly, there are two cones having the reference circle $r_c$ as a base, and a state is assumed in which their apices and generatrices are in contact as illustrated in FIG. 10A. Here, a cone undergoing precession is referred to as a moving cone, and a cone that is fixed as a fixed cone. The apex of the cone is referred to as an origin O, the point of contact between bases as a point $P_1$, a fixed point on the base of the moving cone as a point $P_2$, a leg of a perpendicular line described from the apex to the base of the fixed cone as $H_1$, and a leg of a perpendicular line described from the apex to the base of the moving cone as $H_2$. At this point in time, the locus described by the point $P_2$ when the moving cone undergoes precession is a curve (trochoid curve) along which the teeth need to pass. A case where the moving cone undergoes precession without departing from the fixed cone as illustrated in FIG. 10B is now considered. If the precession is assumed that the moving cone rotates by $-\phi$ about its own axis $OH_2$, and makes $\theta$ rotations around the fixed cone, the point $P_1$ is regarded to have rotated by $\theta$ about $OH_1$, and the point $P_2$ is regarded to have rotated by $-\phi$ about $OH_2$. As illustrated in FIG. 11, a vector normalized in parallel with the line segment $OH_2$ is referred to as n, a vector from the point O to the point $P_1$ as $p_1$, and a vector from the point O to the point $P_2$ as $p_2$. $p_2$ can be regarded as a vector obtained by rotating $p_1$ by $\phi$ about n; accordingly, it can be expressed as:

$$p_2 = p_1 \cos \psi + n(n \cdot p_1)(1-\cos \psi) + (n \times p_1)\sin \psi \quad \text{[Math. 1]}$$

If both of the moving cone and the fixed cone have the base radius $r_c$ and a base angle $\phi_c$, both of n and $p_1$ can be expressed as:

$$n = \begin{pmatrix} \cos\theta \sin 2\phi_c \\ \sin\theta \sin 2\phi_c \\ \cos 2\phi_c \end{pmatrix} \quad \text{[Math. 2]}$$

$$p_1 = \begin{pmatrix} r_c \cos\theta \\ r_c \sin\theta \\ -r_c \tan\phi_c \end{pmatrix}$$

Figure 12:
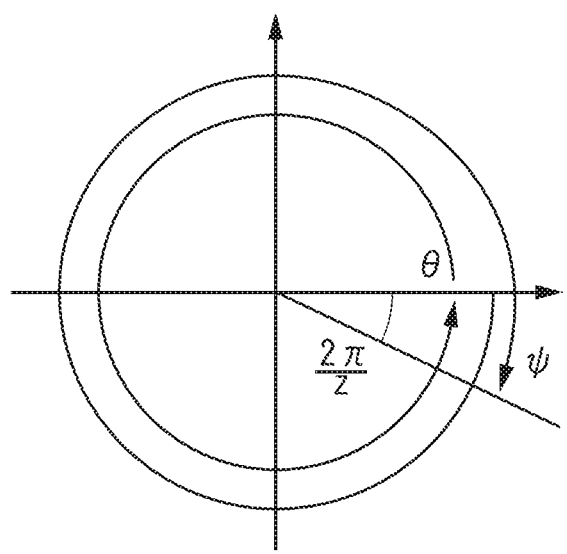
FIG. 12 is a graph illustrating the relationship between $\theta$ and $\phi$.

$p_2$ obtained up to this point can express a vector describing a curve along which the center of each of the top portions 33 and 31 of the first crown gear 11 and the second crown gear 12 needs to pass, by changing the value of $\phi$. Firstly, a curve along which the center of the top portion 33 of the first crown gear 11 needs to pass is obtained. The moving cone is regarded as the first crown gear 11, and the fixed cone as the second crown gear 12. Here, their numbers of teeth are $z_i$ and $z_0$, respectively. Moreover, parameters of the precession of the moving cone be $\theta=\theta_1$ and $\phi=\phi_i$. At this point in time, as illustrated in FIG. 12, in a case of a forward gear, $\phi$ rotates more for one tooth in an opposite direction while $\theta$ makes one rotation, and in a case of a backward gear, $\phi$ rotates less for one tooth in the opposite direction while θ makes one rotation. Accordingly, Math. 3 holds.

$$\begin{cases} \theta_i : \psi_i = 2\pi : -2\pi\left(1 + \dfrac{1}{z_i}\right) & \text{(NORMAL ROTATION)} \\ \theta_i : \psi_i = 2\pi : -2\pi\left(1 - \dfrac{1}{z_i}\right) & \text{(REVERSE ROTATION)} \end{cases}$$ [Math. 3]

When they are organized, $$\begin{cases} \psi_i = -\dfrac{z_i + 1}{z_i}\theta_i & \text{(NORMAL ROTATION)} \\ \psi_i = -\dfrac{z_i - 1}{z_i}\theta_i & \text{(REVERSE ROTATION)} \end{cases}$$ [Math. 4]

If a curve along which the center of the top portion 31 of the second crown gear 12 needs to pass is obtained, the moving cone is regarded as the second crown gear 12, and the fixed cone as the first crown gear 11. Here, the parameters of precession are $\theta = \theta_o$ and $\phi = \phi_o$. Math. 5 holds similarly.

$$\begin{cases} \psi_o = -\dfrac{z_o - 1}{z_o}\theta_o & \text{(NORMAL ROTATION)} \\ \psi_o = -\dfrac{z_o + 1}{z_o}\theta_o & \text{(REVERSE ROTATION)} \end{cases}$$ [Math. 5]

Figure 13:
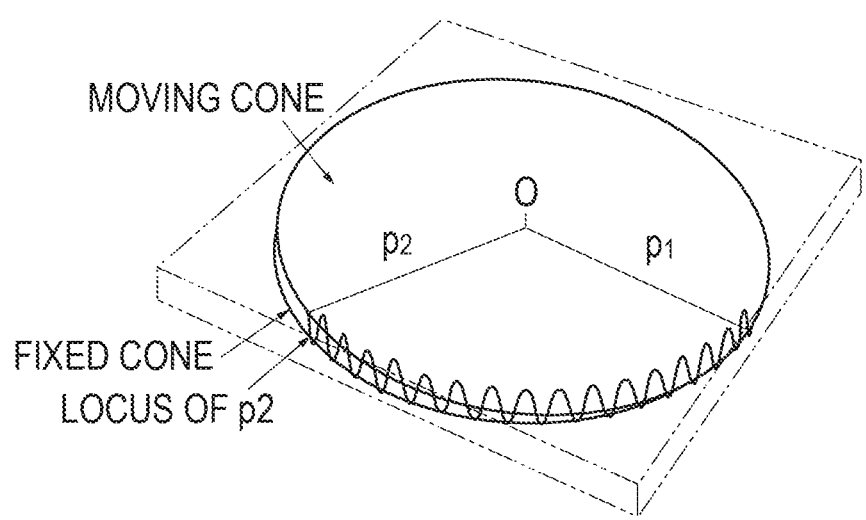
FIG. 13 is a perspective view illustrating a trochoid curve described by a vector $p_2$.

In this manner, Math. 4 or 5 is selected according to the characteristics of gears to be combined. φ is substituted into Math. 1 to obtain the curve along which the center of the top portion needs to pass. An example of the curve obtained at this point in time is illustrated in FIG. 13. In FIG. 13, the locus described by the vector $p_2$ is a trochoid curve. The rotation angle and direction of p1 and p2 are the same as those in FIG. 12.

(The Calculation of a Root Curve)

Figure 14:
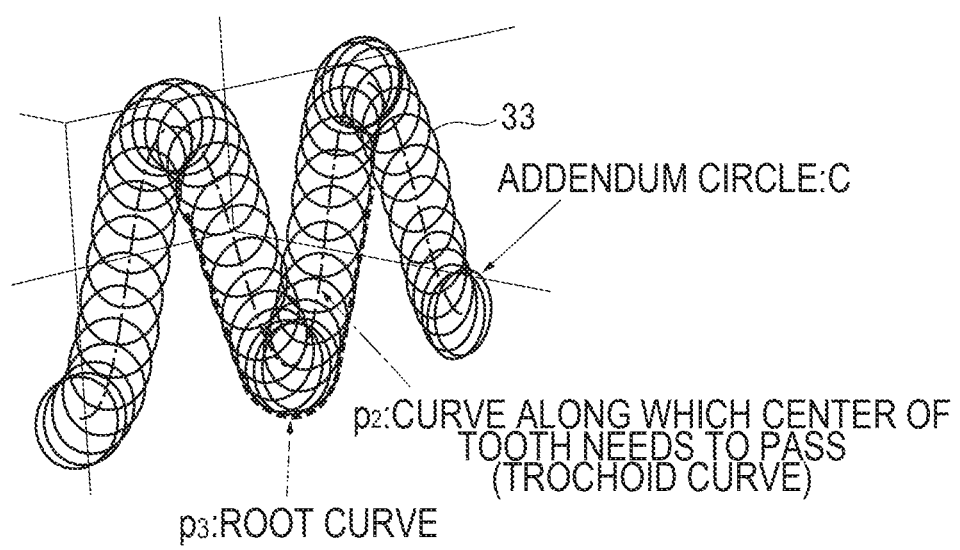
FIG. 14 is a perspective view illustrating the process of forming a root curve $p_3$.
Figure 15:
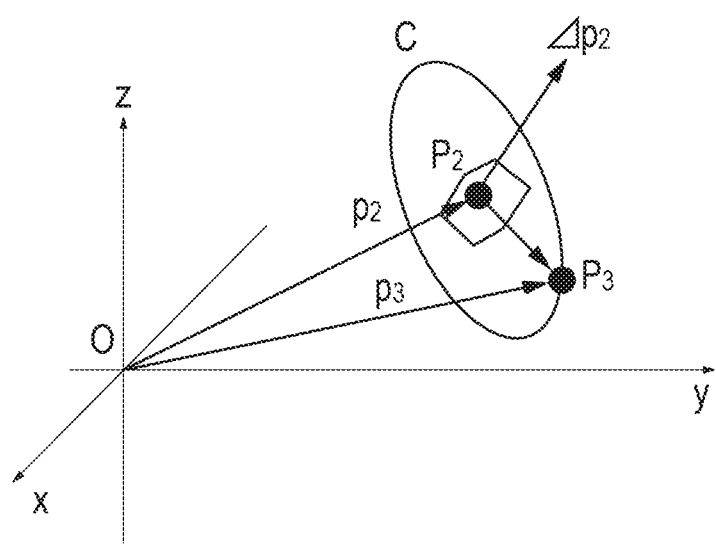
FIG. 15 is a graph illustrating how the root curve $p_3$ is obtained.

Next, a root curve is obtained. As illustrated in FIG. 14, the locus described by the top portion 33 of a counterpart gear is a root curve $p_3$. In other words, it is required to obtain the trochoid curve $p_2$ along which the center of the top portion 33 of the counterpart gear needs to pass and calculate a locus that is obtained when a circle having the radius of the top portion 33 of the counterpart gear is moved along the trochoid curve $p_2$. Here, the radius of the top of the counterpart gear is referred to as $h_k$, and the circle as C. At this point in time, as illustrated in FIG. 15, the vector $p_3$ describing the root curve is a vector up to the point $P_3$ orthogonal to both of $p_2$ and a direction vector $\Delta p_2$ of $p_2$ among points at the time when the circle C is drawn on $p_2$. Therefore, the relationship between Math. 6 and Math. 7 holds.

$$|p_3 - p_2| = h_k$$ [Math. 6]

$$p_2 \perp (p_3 - p_2) \text{ and } \Delta p_2 \perp (p_3 - p_2) \text{ and } p_2 \perp \Delta p_2$$ [Math. 7]

From the above result, $$p_3 - p_2 = \pm h_k \dfrac{\Delta p_2 \times p_2}{|\Delta p_2 \times p_2|}$$ [Math. 8]

$$\Leftrightarrow p_3 = p_2 \pm h_k \dfrac{\Delta p_2 \times p_2}{|\Delta p_2 \times p_2|}$$

holds. Plus or minus in the equation is determined by the direction of the direction vector.

(The Connection of the Addendum Curve and the Root Curve)

Figure 16A:
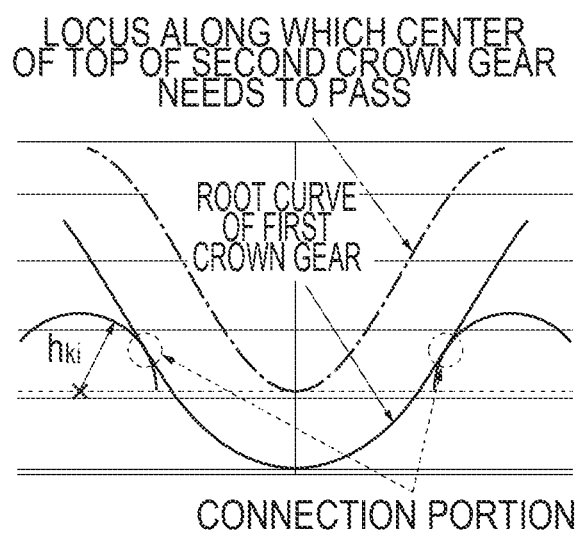
FIG. 16A illustrates a root curve of the first crown gear.
Figure 16B:
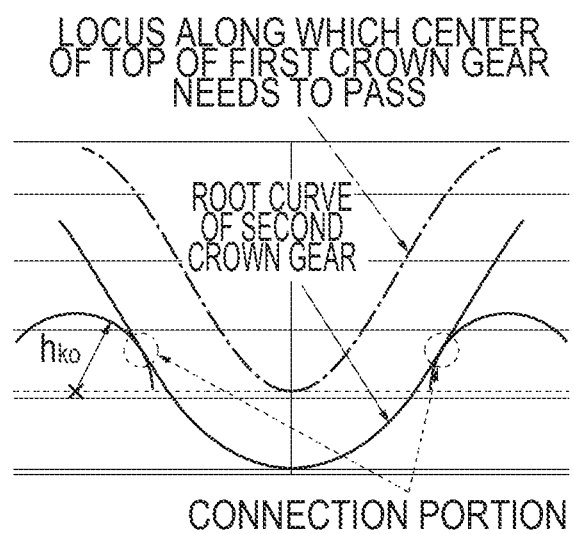
FIG. 16B illustrates a root curve of the second crown gear.

FIG. 16A illustrates the tooth profile curves (the addendum curve and the root curve) of the first crown gear 11 calculated in accordance with the above equations. FIG. 16B illustrates the tooth profile curves (the addendum curve and the root curve) of the second crown gear 12 calculated in accordance with the above equations. The radius of the addendum curve is determined in such a manner that the addendum curve is smoothly linked to the root curve. The radius of the addendum curve is determined on the condition "at the time when the addendum curve and the root curve have only one contact." (Equation of the addendum curve)= (equation of the root curve) is set up. The value of the radius of the top at the time when the above equation has a repeated root is found. From the above, the tooth profile curves of the first crown gear 11 and the second crown gear 12 can be generated.

Figure 17:
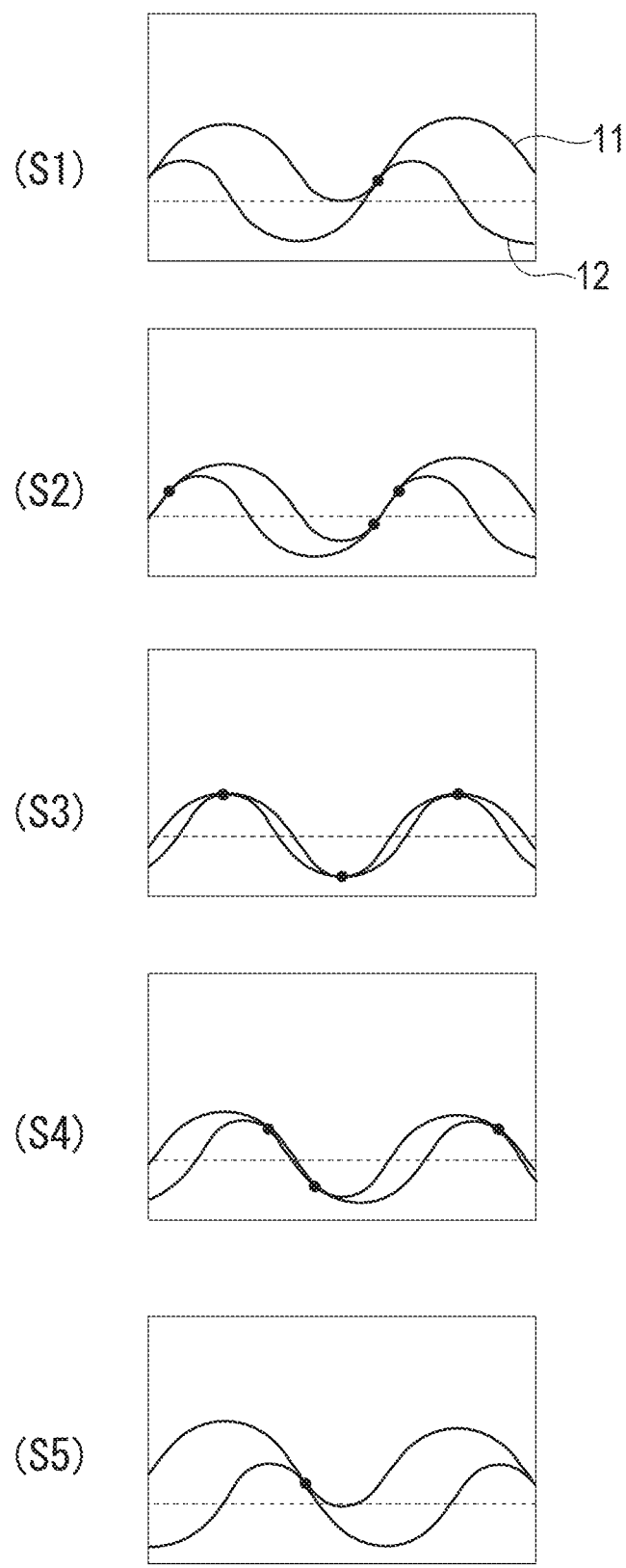
FIG. 17 is a diagram illustrating contacts between the first and second crown gears on the tooth profile curves.

FIG. 17 illustrates the tooth profile curves of the first crown gear 11 and the second crown gear 12 obtained in accordance with the above. Black dots in FIG. 17 illustrate the points of contact. It can be seen that the first crown gear 11 and the second crown gear 12 are always in contact and the points of contact move from the start of contact of (S1) to the end of contact of (S5). It can be seen from the movements of the points of contact that the first crown gear 11 and the second crown gear 12 roll on each other.

It is also possible to form the bottom portions 34 and 32 of the first crown gear 11 and the second crown gear 12 of a side surface of a cone, and generate the top portions 33 and 31 of the first crown gear 11 and the second crown gear 12 with trochoid curves. In this case, the curves of the bottom portions 34 and 32 of the first crown gear 11 and the second crown gear 12 on the reference circle $r_c$ are set as an arc with a single R, and the addendum curves of the top portions 33 and 31 are calculated with trochoid curves.

<Still Another Example of the Form of Teeth of the First and Second Crown Gears (an Example where the Tooth Trace is Helical)>

Figure 18:
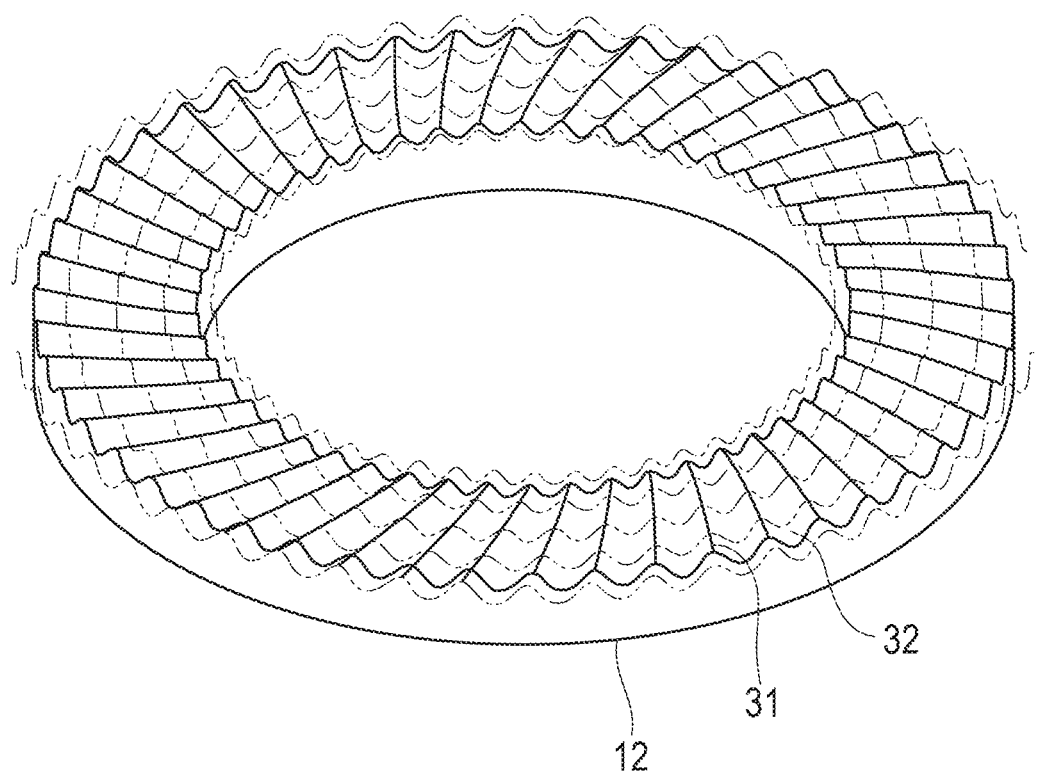
FIG. 18 is a perspective view of the second crown gear when a tooth trace is helical.

As illustrated in FIG. 18, the phase of the tooth profile curve of the second crown gear 12 on the reference circle is displaced in the circumferential direction whenever the radius of the reference circle is changed; accordingly, the tooth trace can be made helical. As illustrated in FIG. 18, the phase of the tooth profile curve is different at an outer side of the second crown gear 12 from the phase at an inner side of the second crown gear 12. Similarly, the tooth trace of the first crown gear 11 can also be made helical similarly.

Figure 19:
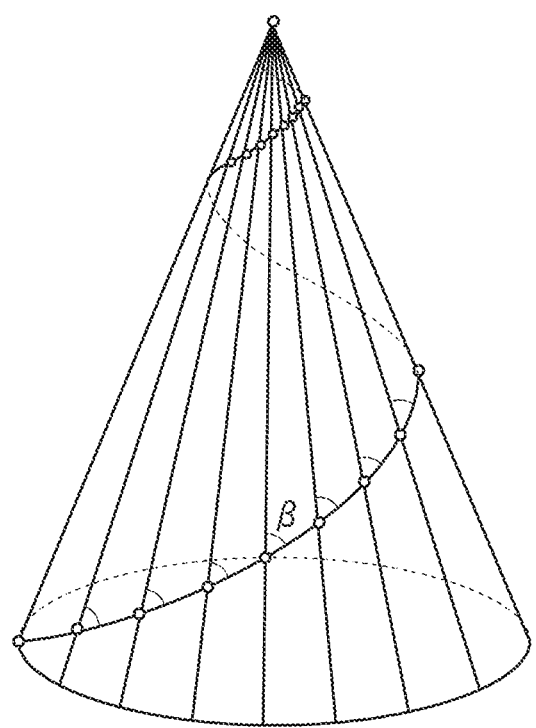
FIG. 19 is a perspective view illustrating a logarithmic spiral.

A logarithmic spiral illustrated in FIG. 19 can be adopted for the helical tooth trace. The logarithmic spiral is a spiral where an angle β formed by the generatrix of a body of a cone is always constant, and can be expressed by Math. 9.

$$\begin{pmatrix} x \\ y \\ z \end{pmatrix} = \begin{pmatrix} ae^{b\theta} \cos\theta \\ ae^{b\theta} \sin\theta \\ ae^{b\theta} \tan\beta \end{pmatrix}$$ [Math. 9]

where a and b are parameters indicating how a spiral winds around.

<Effects of the Speed Reduction Apparatus of the Embodiment>

The configuration of the speed reduction apparatus of the embodiment is described above. According to the speed reduction apparatus of the embodiment, the following effects are exerted. The support unit 14 that supports the first crown gear 11 in such a manner as to be capable of wave motion and incapable of rotation is placed radially outward of the first crown gear 11. Accordingly, the P. C. D (Pitch Circle Diameter) of the ball 9 configuring the spline mechanism of the support unit 14 can be increased. The rotational stiffness of the support unit 14, and by extension the rotational stiffness of the speed reduction apparatus, can be increased. Moreover, the spline mechanism including the ball 9 is used for the support unit 14; accordingly, it is possible to cause the first crown gear 11 to undergo smooth wave motion.

The input shaft 2 penetrates the first crown gear 11 and the second crown gear 12. Accordingly, both ends of the input shaft 2 can be rotatably supported by the bearings 21 and 22. Even if the moment produced by the reaction at the location of contact between the first crown gear 11 and the second crown gear 12 acts on the input shaft 2, the moment stiffness of the input shaft 2 can be improved. Moreover, the axial length of the speed reduction apparatus can also be reduced as compared to a case where the input shaft 2 does not penetrate the first crown gear 11 and the second crown gear 12.

The ball 6 is disposed between the inclined cam 4 of the cam unit 5 and the first crown gear 11 in such a manner as to be capable of rolling motion. Accordingly, it is possible to cause the first crown gear 11 to undergo smooth wave motion.

The outer ring portion of the support unit 14 is integral with the housing 1. Accordingly, a reduction in the number of parts of the speed reduction apparatus and a size reduction in the radial direction can be promoted.

The inner ring portion 7 of the support unit 14 is fixed by a fastening member to the first crown gear 11 to facilitate the manufacture of the first crown gear 11 and the inner ring portion 7.

The top portions 33 and 31 of the first crown gear 11 and the second crown gear 12 are of a convex shape based on a side surface of a cone. The bottom portions 34 and 32 of the first crown gear 11 and the second crown gear 12 are of a concave shape based on a side surface of a cone. Accordingly, the top portions 33 and 31 and the bottom portions 34 and 32 engage with each other, mostly rolling; therefore, the efficiency of the gear can be improved.

The apices P2 of the cones of the top portions 33 and 31 and the bottom portions 34 and 32 of the first crown gear 11 and the second crown gear 12 agree with the center P1 of the precession of the first crown gear 11. Accordingly, the top portions 33 and 31 can be brought into line contact with the bottom portions 34 and 32. The area of contact and the contact ratio can be increased. Accordingly, stiffness, efficiency, and noise reduction can be increased.

The top portions 33 and 31 of the first crown gear 11 and the second crown gear 12 are of a shape formed by a side surface of a cone. The bottom portions 34 and 32 of the first crown gear 11 and the second crown gear 12 are of a shape generated using a trochoid curve described when the conical body of the first crown gear 11 is rolled along the conical body of the second crown gear 12. Accordingly, it is possible to engage the top portions 33 and 31 and the bottom portions 34 and 32 while they roll completely. Stiffness, efficiency, and noise reduction can be further increased.

The radius R of the cone of the top portion 33 of the first crown gear 11 agrees with the radius R of the cone of the top portion 31 of the second crown gear 12. Accordingly, the manufacture of both of the top portions 33 and 31 is easy, and their strength can also be caused to agree.

The tooth traces of the top portions 33 and 31 and the bottom portions 34 and 32 of the first crown gear 11 and the second crown gear 12 are helical. Accordingly, the area of contact and the contact ratio can be increased. Stiffness, efficiency, and noise reduction can be further increased.

<A Speed Reduction Apparatus of a Second Embodiment>

Figure 20:
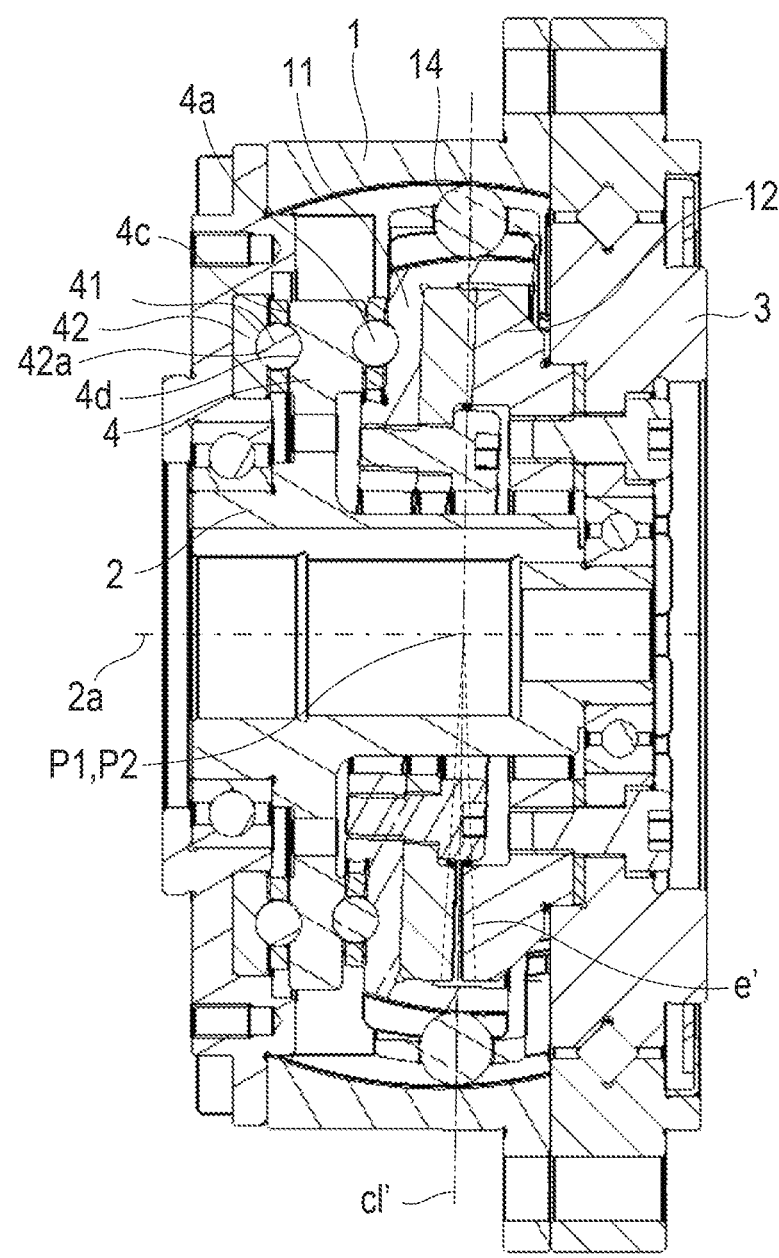
FIG. 20 is a cross-sectional view along the axis of a speed reduction apparatus of a second embodiment of the present invention.

FIG. 20 illustrates a cross-sectional view of a speed reduction apparatus of a second embodiment of the present invention. The speed reduction apparatus of the embodiment includes a housing 1, an input shaft 2, an inclined cam 4 integral with the input shaft 2, a first crown gear 11, a second crown gear 12, a support unit (spherical spline) 14, and an output unit 3 as in the speed reduction apparatus of the first embodiment. Their configurations are substantially the same as those of the speed reduction apparatus of the first embodiment. Accordingly, the same reference signs are assigned, and their descriptions are omitted.

The speed reduction apparatus of the second embodiment is different from the speed reduction apparatus of the first embodiment in the respect that balls 41 as rolling elements are disposed between the housing 1 and the inclined cam 4 in such a manner as to be capable of rolling motion. A circular ball rolling groove 4d is formed in a surface 4c, which is opposed to the housing 1 (that is, a back surface of the cam surface 4a), of the inclined cam 4 integral with the input shaft 2. A ring 42 is fixed to the housing 1. A circular ball rolling groove 42a facing the ball rolling groove 4d is formed in the ring 42. A plurality of the balls 41 is arranged between the ball rolling groove 4d and the ball rolling groove 42a in such a manner as to be capable of rolling motion in the circumferential direction.

A reaction occurs at the location of contact between the first crown gear 11 and the second crown gear 12. A component of force in the axial direction acts on the inclined cam 4 due to the reaction. The balls 41 are disposed between the housing 1 and the inclined cam 4. Accordingly, the component of force can be supported, and the stiffness of the speed reduction apparatus can be improved.

<A Speed Reduction Apparatus of a Third Embodiment>

Figure 21:
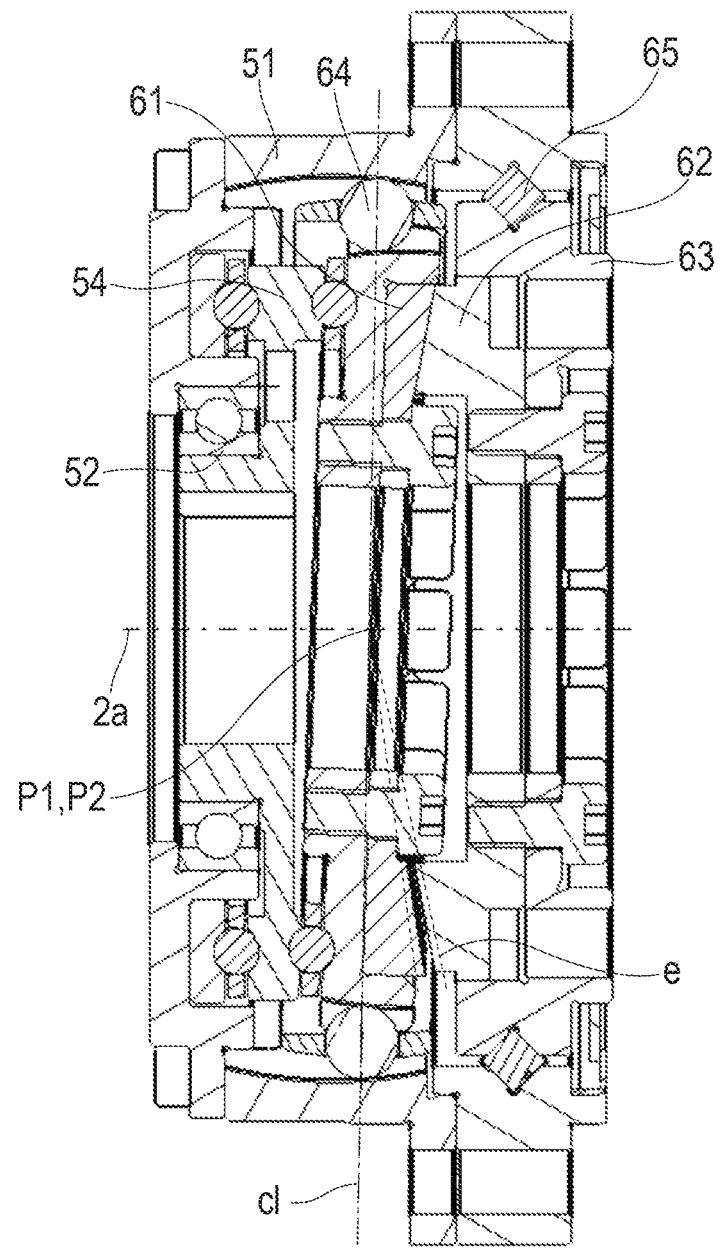
FIG. 21 is a cross-sectional view along the axis of a speed reduction apparatus of a third embodiment of the present invention.

FIG. 21 illustrates a cross-sectional view of a speed reduction apparatus of a third embodiment of the present invention. The speed reduction apparatus of the embodiment also includes a housing 51, an input shaft 52, an inclined cam 54 integral with the input shaft 52, a first crown gear 61, a second crown gear 62, a support unit (spherical spline) 64, and an output unit 63. The basic operation of the speed reduction apparatus of the third embodiment is the same as the speed reduction apparatuses of the first and second embodiments. In other words, when the input shaft 52 is rotated, the inclined cam 54 integral with the input shaft 52 causes the first crown gear 61 to undergo wave motion. The second crown gear 62 is caused to make rotations equal to the difference in the number of teeth between them with the wave motion of the first crown gear 61.

The speed reduction apparatus of the third embodiment is different from the speed reduction apparatuses of the first and second embodiments in the respect that the second crown gear 62 is bevel gear-shaped, and the first crown gear 61 is reverse bevel gear-shaped. In other words, a surface, which is opposed to the first crown gear 61, of the second crown gear 62 is formed in a conical shape that protrudes toward the first crown gear 61. The angle of the apex of the cone is smaller than the angle of the apex of the cone of the second crown gear 12 of the speed reduction apparatuses of the first and second embodiments. A surface, which is opposed to the second crown gear 62, of the first crown gear 61 is formed in a conical shape recessed like a bowl. However, an engagement center P2 of the first crown gear 61 and the second crown gear 62 (the apices of cones of top portions and bottom portions of the first crown gear 61 and the second crown gear 62) remains in agreement with a center P1 of the wave motion of the first crown gear 61. This point is the same as the speed reduction apparatuses of the first and second embodiments (refer to FIG. 20).

An outside diameter of the second crown gear 62 is smaller than an inside diameter of a ring-shaped rolling element line (a cross roller ring 65) that rotatably supports the output unit 63. The second crown gear 62 is embedded in the output unit 63. In the speed reduction apparatus of the third embodiment, the second crown gear 62 is formed in a bevel gear shape, and the first crown gear 61 in a reverse bevel gear shape. Accordingly, a contact portion e (an inner area between broken lines of FIG. 21) can be offset toward the output unit 63 from a center line cl of the support unit (spherical spline) 64 while keeping the engagement center P2 and the center P1 of wave motion agreeing with each other. Therefore, the first crown gear 61 and the second crown gear 62 can be offset toward the output unit 63 from the center line cl. Hence, the second crown gear 62 can be embedded in the output unit 63. When both of the second crown gear 12 and the first crown gear 11 are formed in a bevel gear shape as illustrated in FIG. 20, a contact portion e' (an inner area between broken lines of FIG. 20) is located on a center line cl' of the support unit (spherical spline) 14.

The first crown gear 61 and the second crown gear 62 are offset toward the output unit 63 from the center line cl, and the second crown gear 62 is embedded in the output unit 63. Accordingly, the dimension in the axial direction can be significantly reduced without increasing the diameter of the cross roller ring 65. Moreover, the dimension of the housing 51 in the axial direction is reduced to increase a spring constant of the housing 51. Accordingly, the rotational stiffness of the output unit 63 can be increased.

<The Design of the Teeth of the Speed Reduction Apparatus of the Third Embodiment>

Figure 22A:
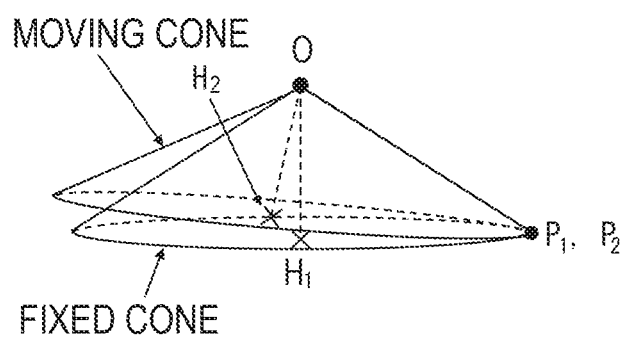
FIG. 22A is a perspective view illustrating a state where apices and generatrices of a moving cone (a body of the first crown gear) and a fixed cone (a body of the second crown gear) are in contact.
Figure 22B:
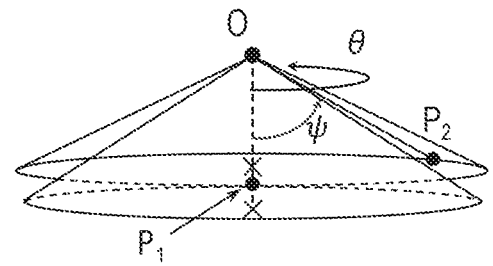
FIG. 22B is a perspective view illustrating the precession of the moving cone.

The design of the teeth of the speed reduction apparatus of the third embodiment is substantially the same as that of the speed reduction apparatus of the first embodiment. However, the first crown gear 61 has a conical body that is like a bowl over the second crown gear 62, and the second crown gear 62 has a conical body that protrudes toward the first crown gear 61. Hence, as illustrated in FIG. 22A, it is designed to have a shape where the first crown gear 61 being a moving cone covers over the second crown gear 62 being a fixed cone. Upon obtaining a trochoid curve, Math. 2 described above needs to be changed to:

$$n = \begin{pmatrix} -\cos\theta\sin(\phi_{cf} - \phi_{cr}) \\ -\sin\theta\sin(\phi_{cf} - \phi_{cr}) \\ -\cos(\phi_{cf} - \phi_{cr}) \end{pmatrix}$$ [Math. 2a]

$$p_1 = \begin{pmatrix} r_{cf}\cos\theta \\ r_{cf}\sin\theta \\ -r_{cf}\tan\phi_{cf} \end{pmatrix}$$

where the base radius of the moving cone is $r_{cr}$, the base angle is $\phi_{cr}$, the base radius of the fixed cone is $r_{cf}$, and the base angle is $\phi_{cf}$. Other Math. 3 to Math. 7 do not need to be changed.

Figure 23:
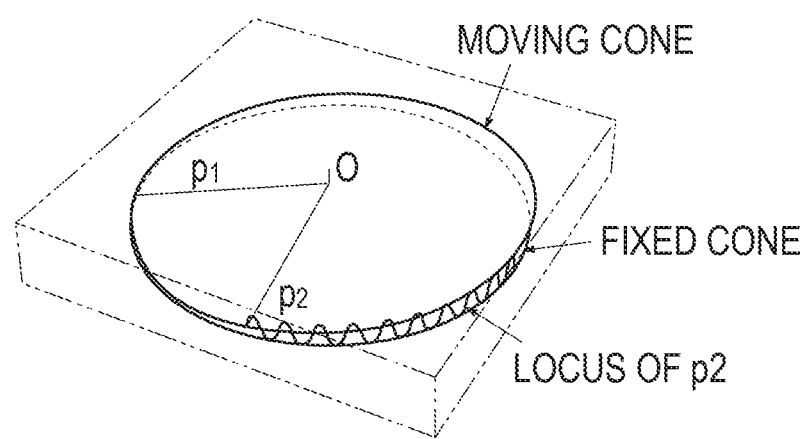
FIG. 23 is a perspective view illustrating a trochoid curve described by a vector $p_2$.

FIG. 23 illustrates the trochoid curve obtained. In FIG. 23, the locus described by a vector $p_2$ is the trochoid curve.

The present invention is not limited to the realization of the embodiments, and can be realized in various embodiments within the scope that does not change the gist of the present invention.

In the above embodiments, the descriptions are given focusing on the speed reducer. However, usage as a speed increaser that is compact in the axial direction is also possible by exchanging the locations of the input side and the output side. For example, the present invention is used as a speed increaser for a generator having large power on the input side, such as a hydro power generator, to promote a size reduction in the axial direction.

The present description is based on Japanese Patent Application No. 2015-039782 filed on Mar. 2, 2015 and Japanese Patent Application No. 2015-039783 filed on Mar. 2, 2015, the entire contents of which are incorporated herein.

REFERENCE SIGNS LIST

1 Housing
1a Housing body
1b, 1c Lid member
2 Input shaft
2a Axis
3 Output unit
4 Inclined cam
5 Cam unit
6 Ball (rolling element of the cam unit)
7 Inner ring portion
7a Inner ring spline groove
9 Ball (rolling element of the support unit)
10 Outer ring portion
10a Outer ring spline groove
11 First crown gear
12 Second crown gear
14 Support unit
31 Top portion of the second crown gear
32 Bottom portion of the second crown gear
33 Top portion of the first crown gear
34 Bottom portion of the first crown gear
C1 Cone (cone of the top portion of the second crown gear)
C2 Cone (cone of the bottom portion of the second crown gear)
C3 Cone (cone of the top portion of the first crown gear)
C4 Cone (cone of the bottom portion of the first crown gear)
P2 Apex of the cone
P1 Center of wave motion
$p_2$ Trochoid curve

The invention claimed is:

1. A speed reduction or speed increasing apparatus comprising:
    a first crown gear;
    a second crown gear having a different number of teeth from the first crown gear, the second crown gear facing the first crown gear; and
    a cam unit configured to incline the first crown gear with respect to the second crown gear in such a manner that the first crown gear engages with the second crown gear and causes the first crown gear to precess in such a manner that a location of contact moves, wherein, the first crown gear and the second crown gear each include a plurality of top portions and a plurality of bottom portions alternately positioned in a circumferential direction, the top portions of the first crown gear have shapes formed by parts of side surfaces of cones, a curve on a reference circle of the bottom portion of the second crown gear is formed when a circle having a radius of the top portions of the first crown gear precesses, the top portions of the second crown gear have shapes formed by parts of side surfaces of cones, a curve on the reference circle of the bottom portions of the first crown gear is formed when a circle having a radius of the top portions of the second crown gear precesses, a support unit to support the first crown gear in such a manner as to be capable of precession includes:

an outer ring portion having outer ring spline grooves in an inner peripheral surface thereof, an inner ring portion having inner ring spline grooves in an outer peripheral surface thereof, the inner ring spline grooves facing the outer ring spline grooves, and a plurality of balls for the support unit disposed between each of the outer ring spline grooves and each of the inner ring spline grooves in such a manner as to be capable of rolling motion, an output unit, whose speed is reduced or increased by the first crown gear and the second crown gear, is rotatably supported by a cross roller relative to a housing, and the cross roller is a roller line where axes of rollers adjacent in a circumferential direction are orthogonal when viewed from the circumferential direction.

2. The speed reduction or speed increasing apparatus according to claim 1, wherein the circle having the radius of the top portions of the first crown gear agrees with the circle having a radius of the top portions of the second crown gear.

3. A speed reduction or speed increasing apparatus comprising:

a first crown gear;

a second crown gear having a different number of teeth from the first crown gear, the second crown gear facing the first crown gear; and a cam unit configured to incline the first crown gear with respect to the second crown gear in such a manner that the first crown gear engages with the second crown gear and causes the first crown gear to precess in such a manner that a location of contact moves, wherein the first crown gear and the second crown gear each include a plurality of top portions and a plurality of bottom portions alternately positioned in a circumferential direction, a curve on a reference circle of the top portions of the first crown gear is formed in an arc, a curve on the reference circle of the bottom portions of the second crown gear is formed when a circle having a radius of the top portions of the first crown gear precesses, the curve on the reference circle of the top portions of the second crown gear is formed in an arc, the curve on the reference circle of the bottom portions of the first crown gear is formed when a circle having a radius of the top portions of the second crown gear precesses, tooth traces of the top portions and the bottom portions of the first crown gear are helical having a phase of a tooth profile curve on the reference circle displaced in the circumferential direction whenever the reference circle is changed, tooth traces of the top portions and the bottom portions of the second crown gear are helical having a phase of a tooth profile curve on the reference circle of the second crown gear displaced in the circumferential direction whenever the reference circle is changed, thereby increasing an area of contact and a contact ratio of the teeth of the first crown gear and the second crown gear, a support unit to support the first crown gear in such a manner as to be capable of precession includes:

an outer ring portion having outer ring spline grooves in an inner peripheral surface thereof, an inner ring portion having inner ring spline grooves in an outer peripheral surface thereof, the inner ring spline grooves facing the outer ring spline grooves, and a plurality of balls for the support unit between each of the outer ring spline grooves and each of the inner ring spline grooves in such a manner as to be capable of rolling motion, an output unit, whose speed is reduced or increased by the first crown gear and the second crown gear, is rotatably supported by a cross roller relative to a housing, and the cross roller is a roller line where axes of rollers adjacent in a circumferential direction are orthogonal when viewed from the circumferential direction.

* * * * *